United States Patent [19]
Hogg

[11] 3,815,023
[45] June 4, 1974

[54] PULSE WIDTH STABILIZING METHOD AND APPARATUS

[75] Inventor: Walter R. Hogg, Miami Lakes, Fla.

[73] Assignee: Coulter Electronics, Inc., Hialeah, Fla.

[22] Filed: June 18, 1973

[21] Appl. No.: 371,129

[52] U.S. Cl. .......................................... 324/71 CP
[51] Int. Cl. .......................................... G01n 27/00
[58] Field of Search ............ 324/71 CP; 235/92 PC; 73/432 PS

[56] References Cited
UNITED STATES PATENTS

| | | |
|---|---|---|
| 3,392,331 | 8/1968 | Coulter .......................... 324/71 CP |
| 3,487,697 | 1/1970 | Epstein .......................... 324/71 CP |

*Primary Examiner*—Alfred E. Smith
*Assistant Examiner*—Rolf Hille
*Attorney, Agent, or Firm*—Silverman & Cass

[57] ABSTRACT

A method and apparatus for stabilizing the widths of particle pulses produced by a Coulter type scanning aperture. The apparatus includes circuitry for sensing the widths of the particle pulses and a comparator for comparing each sensed width with a signal representative of a desired pulse width. Based upon the width comparison, an error signal is produced and coupled to control structure which varies the flow of particles through the scanning aperture, such that the error signal is reduced.

12 Claims, 1 Drawing Figure

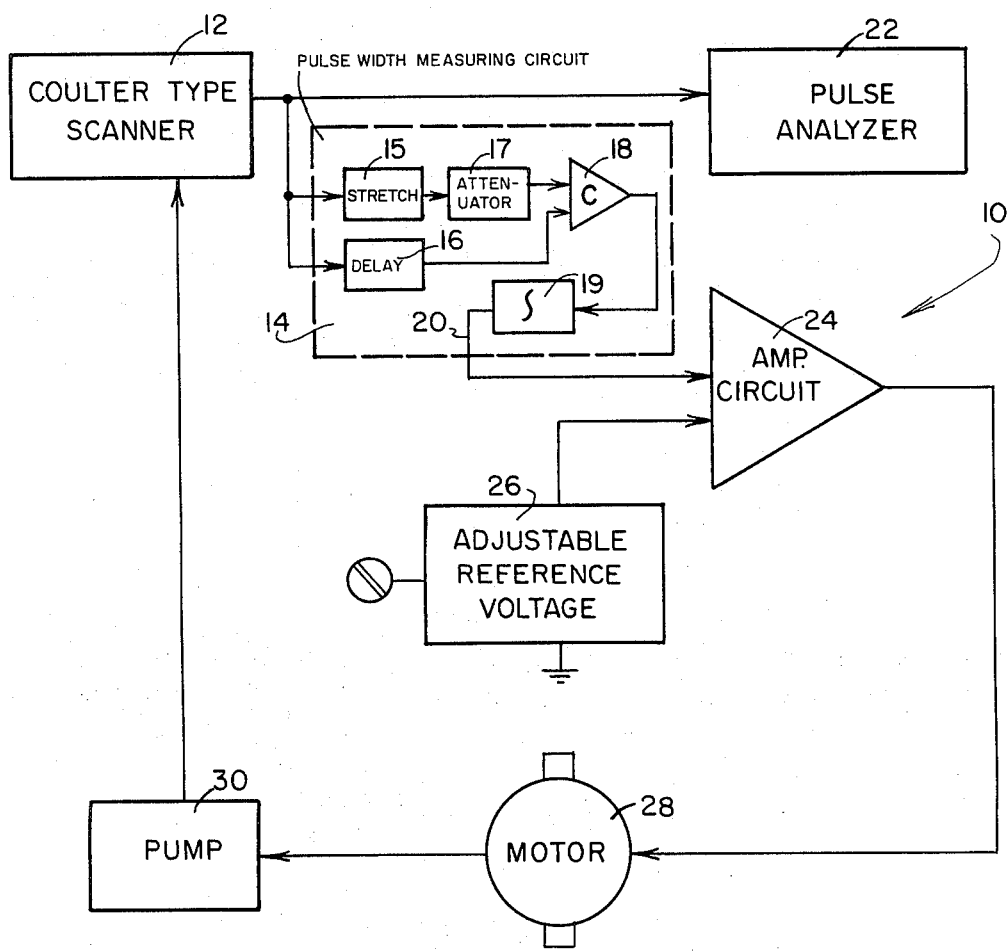

PULSE WIDTH STABILIZING METHOD AND APPARATUS

BACKGROUND OF THE INVENTION

This invention is concerned with the measurement of microscopic particles and is directed toward stabilizing the duration of pulses produced during the analysis of said pulses in accordance with the teachings of the Coulter principle of electronic particle analysis. The Coulter principle is set forth basically in U. S. Pat. No. 2,656,508 and has been the subject of numerous improvements over the past 20 years. U. S. Pat. No. 3,259,842 describes a product commercialized under the registered trademark "Coulter Counter" and Model B designation of Coulter Electronics, Inc. of Hialeah, Florida.

According to the Coulter principle, when a microscopic particle in suspension in an electrolyte is passed through an electrical field of small dimensions approaching those of the particle, there will be a momentary change in the electric impedance of the electrolye in the ambit of the field. This change of impedance diverts some of the excitation energy into the associated circuitry, giving rise to an electrical signal. Such signal has been accepted as a reasonably accurate indication of the particle volume for most biological and industrial purposes. Apparatus embodying the teachings of U. S. Pat. No. 2,656,508 has been used to count and size particles in biological fluids, industrial powders and slurries, etc.

The principles of the present invention apply to Coulter particle analyzing apparatus in which the excitation of the field is achieved by means of unidirectional or low frequency power sources or radio frequency power sources.

In commercial versions of the Coulter particle analyzing apparatus, the electric field of small dimensions has been formed commonly by a microscopic right cylindrical passageway or aperture, as it is known, between two bodies of liquid in which the particles to be studied are suspended. The electrical excitation energy is coupled to these bodies by means of electrodes respectively located in the liquid bodies, the aperture being formed in an insulating wall between the bodies. The suspension is caused to flow through the aperture carrying the particles with the flow and giving rise to the electric signals produced by the momentary charges in impedance caused by the respective particles as they pass through the aperture. The electric field is concentrated in the aperture and normally comprises an electric current flowing through the aperture along with the physical flow of suspension.

By counting the signals produced, one can count the particles passing through the aperture. By discriminating between noise and pulses produced by particles, one can count the particles passing through the aperture. By discriminating between different pulse amplitudes, one can make size studies.

A phenomenon that affects the accurate measurement of particles according to the Coulter principle is the electrolyte velocity through the aperture. The electrolyte velocity effectively controls the width of the pulse produced by the particle carried by the flowing electrolyte through the aperture.

It has been found that changes in aperture diameter and length, the viscosity of the electrolyte as well as other factors, affect the time it takes for the particle to pass through the aperture, which, in turn, varies the width of the particle pulse produced. This variation in pulse width causes an undesirable degradation in the analysis of the particle pulses.

SUMMARY OF THE INVENTION

The invention contemplates a stabilizing apparatus and method for stabilizing the widths of particle pulses produced in a Coulter type scanning aperture. The stabilizing apparatus comprises means for sensing the width of the particle pulses. The sensing means produce a first signal proportional to the width of each pulse. Reference means and comparing means are included, the former for providing a reference signal proportional to a desired pulse width and the latter for comparing the reference signal with the first signal and providing an error signal. Control means are included and coupled to receive the error signal. The control means control the flow of the particles through the aperture. The error signal is operative on the control means to cause the width of the particle pulses to vary, such that the error signal is reduced, and thus stabilize the pulse width relative to the desired pulse width.

BRIEF DESCRIPTION OF THE DRAWING

The FIGURE is a block diagram of the stabilizing apparatus according to the invention.

DETAILED DESCRIPTION OF THE PREFERRED EMBODIMENT

The invention herein described controls the width of pulses produced by sample particles as they pass through a Coulter type scanning aperture. The stabilizing circuit is generally indicated in the FIGURE by numeral 10.

A scanner 12, which is comprised of a Coulter type aperture, produces an electrical signal every time a particle passes through the aperture in accordance with the teaching of the Coulter principles of particle analysis. The amplitude of the particle pulse is proportional to the volume of the particle and the width of the pulse is proportional to the time it takes for the particle to pass through the Coulter type aperture. In accordance with the Coulter teachings, sample particles are suspended in an electrolyte fluid and a pressure differential is applied to the opposite sides of the scanning aperture, thereby causing particles to pass through the aperture. The scanner 12 can be similar to that described in U.S. Pat. No. 3,259,842.

The particle pulse produced at scanner 12 is coupled to sensing means comprising a pulse width measuring circuit 14. A pulse width measuring circuit 14 is comprised of a pulse stretcher 15, a delay line 16, attenuator 17, comparator 18, integrator 19, and output line 20. The pulse stretcher 15 has its input coupled to the output of scanner 12. The attenuator 17 has its input coupled to the output of pulse stretcher 15 and its output coupled to comparator 18. Delay line 16 is coupled to the output of the scanner 12 and its output is coupled to comparator 18. The output of the comparator 18 is coupled to the integrator 19. The output line 20 is coupled to the output of integrator 19. The operation of pulse width measuring circuit 14 is more fully described in U.S. Pat. No. 3,701,029, entitled "AXIAL TRAJECTORY SENSOR HAVING GATING MEANS CONTROLLED BY PULSE DURATION MEASURING FOR ELECTRONIC PARTICLE STUDY APPA- RATUS AND METHOD." Pulse width measuring circuit 14 provides a fractional height pulse duration output voltage at output line 20. The voltage on line 20 is proportional to the typical pulse width at the output of scanner 12. The typical pulse width can be representative of the average width of the pulses measured between the half-amplitude points of the pulses. What has been shown is only one practical circuit for producing a signal proportional to the typical pulse width. Those skilled in the art can provide equivalent circuits to perform the same function. The output of scanner 12 also is coupled to a pulse analyzer 22 for further pulse analysis, such as counting in accordance with the teachings of U.S. Pat. Nos. 2,656,508, 3,259,842, and 3,701,029.

The output 20 of integrator 19 is coupled to comparing means comprising a difference amplifying circuit 24. Also coupled to difference amplifying circuit 24 are reference means 26 which provide an adjustable reference voltage. The circuit 24 can comprise a comparator, for instance, or other conventional circuitry suitable for achieving this function. Reference means 26 which can comprise a variable resistor coupled to a source of voltage with the wiper thereof providing variable voltage to the circuit 24. Means 26 comprise other conventional circuitry suitable for achieving this function.

Difference amplifying circuit 24 compares and amplifies the difference between the fractional height pulse duration voltages at output 20 and the reference voltage to provide an amplified error signal to control means comprising a motor 28 and a pump 30. The motor 28 is controlled by the amplitude of the error signal from circuit 24 and the motor 28 controls the pumping action of pump 30, which is hydraulically coupled to scanner 12. The motor 28 can be a torque motor and the pump can be of the positive displacement type. As the error signal increases in amplitude, more torque is applied by motor 28 to pump 30 to increase its pumping action, thereby increasing the hydraulic pressure to scanner 12 and the differential pressure applied to the aperture within scanner 12. The motor 28 could be one which changes its RPM in response to the error signal. In such case, the pump 30 could be a centrifugal pump.

The velocity of the electrolyte fluid containing the sample particles thereby is increased due to this increased pressure differential. Accordingly, particles are passed through the aperture at an increased velocity, thereby decreasing the width of the particle pulses produced. As the width of the particle pulse is decreased, the amplitude of the fractional height pulse duration voltage at output 20 is decreased, thereby decreasing the amplitude of the error signal coupled to motor 28. The error signal will continue to be applied to motor 28 until an equilibrium particle pulse width is reached. The gain of circuit 24 is chosen to be large enough such that the error signal is vanishingly smaller.

The equilibrium particle pulse width is controlled by the amplitude of the reference voltage. In situations where the width of the particle pulse varies from the equilibrium pulse width, an error signal will be produced by circuit 24 which tends to return the system back to an equilibrium state.

Particle analyzing errors heretofore encountered by variations in pulse width in Coulter type counters are reduced by the apparatus described herein. The apparatus 10 automatically will compensate for variations in particle pulse width caused by changes in the aperture size, the viscosity of the electrolyte, and other factors which tend to vary the width of the particle pulses.

What is desired to be secured by United States Letters Patent is claimed:

1. Apparatus for stabilizing the width of particle pulses produced by a Coulter type of scanning aperture when particles are caused to flow therethrough, comprising:
    means for sensing the typical width of said particle pulses and producing a first signal proportional thereto.;
    reference means for providing a reference signal;
    comparing means for comparing said first signal and said reference signal, said comparing means providing an error signal; and
    control means coupled to respond to said error signal and changes thereof for controlling the rate of flow of said particles through the scanning aperture, to cause the width of said particle pulses to vary in a direction to reduce said error signal.

2. Apparatus as claimed in claim 1 wherein said comparing means include a differential amplifier which provides said error signal, said error signal being proportional to the difference between said first signal and said reference signal.

3. Apparatus as claimed in claim 2 wherein said reference means include means for varying said reference signal.

4. Apparatus as claimed in claim 1 wherein said reference means include means for varying said reference signal.

5. Apparatus as described in claim 4 wherein said control means includes a motor and a pump, said motor responsive to the amplitude of said error signal and coupled to said pump, said pump coupled to vary hydraulic pressure applied to the Coulter scanning aperture in accordance with the response of said motor to said error signal and varying said hydraulic pressure in a direction to decrease the amplitude of said error signal.

6. Apparatus as described in claim 1 wherein said control means includes a motor and a pump, said motor responsive to the amplitude of said error signal and coupled to said pump, said pump coupled to vary hydraulic pressure applied to the Coulter scanning aperture in accordance with the response of said motor to said error signal and varying said hydraulic pressure in a direction to decrease the amplitude of said error signal.

7. An apparatus as claimed in claim 6 wherein said sensing means includes a pulse width measuring circuit for producing a voltage proportional to the duration of the particle pulse at a fractional amplitude thereof.

8. Apparatus as claimed in claim 1 wherein said sensing means includes a pulse width measuring circuit for producing a voltage proportional to the duration of the particle pulse at a fractional amplitude thereof.

9. Method for stabilizing the width of particle pulses produced by a Coulter type of scanning aperture when particles are caused to flow therethrough, comprising the steps of:
    sensing the typical width of said particle pulses;
    producing a first signal proportional to the typical width of said particle pulses;
    providing a reference signal;

comparing said first signal with said reference signal and providing an error signal proportional thereto;

controlling the flow of said particles through the scanning aperture such that the width of said particle pulses vary in a direction to reduce said error signal.

10. A method as claimed in claim 9 including the step of:

applying a variable hydraulic pressure to the Coulter scanning aperture such that the amplitude of said error signal is decreased.

11. A method as claimed in claim 10 including the step of:

employing the error signal for varying the hydraulic pressure.

12. Apparatus as claimed in claim 1 and in combination therewith a Coulter type of scanning aperture.

* * * * *